United States Patent
Ho et al.

(10) Patent No.: US 6,356,000 B1
(45) Date of Patent: Mar. 12, 2002

(54) MAGNETICALLY AUGMENTED ROTATION SYSTEM

(76) Inventors: Chun-Yuan Ho; Tien-See Chow, both of 10 Confucius Plz. #5 F, New York, NY (US) 10002

( * ) Notice: Subject to any disclaimer, the term of this patent is extended or adjusted under 35 U.S.C. 154(b) by 0 days.

(21) Appl. No.: 09/775,437

(22) Filed: Feb. 2, 2001

(51) Int. Cl.[7] .................. H02K 7/10; H02K 7/09; H02K 1/17; H02K 1/27
(52) U.S. Cl. .................. 310/154.01; 310/156.01; 310/90.5; 310/80
(58) Field of Search .................. 310/152, 90, 90.5, 310/1, 154.01, 154.04, 154.24, 154.23, 154.22, 154.21, 154.29, 154.28, 156.01; 180/205, 220, 206, 214, 65.1, 65.2, 76, 84, 80, 75 B, 75 C, 78

(56) References Cited

U.S. PATENT DOCUMENTS

| | | |
|---|---|---|
| 2,351,424 A | 6/1944 | Hansen, Jr. |
| 3,734,565 A | 5/1973 | Mulasmajic |
| 3,768,532 A | 10/1973 | Arai |
| 4,062,421 A * | 12/1977 | Weber .................. 180/205 |
| 4,095,663 A * | 6/1978 | Gaffney .................. 180/205 |
| 4,179,633 A | 12/1979 | Kelly |
| 4,571,528 A * | 2/1986 | McGee et al. .......... 310/154.29 |
| D289,512 S | 4/1987 | Fukuchi |
| 4,833,351 A * | 5/1989 | Forys et al. .................. 310/12 |
| 5,002,296 A | 3/1991 | Chiu |
| 5,118,977 A * | 6/1992 | Bertram et al. ........... 310/49 R |
| 5,182,533 A * | 1/1993 | Ritts .................. 335/306 |
| 5,481,146 A * | 1/1996 | Davey .................. 310/154.05 |
| 5,514,926 A * | 5/1996 | Bushman .................. 310/105 |
| 5,788,007 A * | 8/1998 | Miekka .................. 180/205 |
| 6,137,194 A * | 10/2000 | Haugseth .................. 310/1 |
| 6,163,148 A * | 12/2000 | Takada et al. ............. 180/206 |
| 6,274,959 B1 * | 8/2001 | Uchiyama .................. 310/152 |

FOREIGN PATENT DOCUMENTS

| | | | | |
|---|---|---|---|---|
| DE | 3422280 A1 * | 4/1986 | .......... | H02K/53/00 |
| DE | 3931611 A1 * | 3/1990 | .......... | H02K/21/00 |
| JP | 359117449 A * | 7/1984 | .......... | H02K/21/00 |
| JP | 362247755 A * | 10/1987 | .......... | H02K/53/00 |
| JP | 406245483 A * | 9/1994 | .......... | H02K/53/00 |

* cited by examiner

*Primary Examiner*—Nestor Ramirez
*Assistant Examiner*—Guillermo Perez

(57) ABSTRACT

A magnetically augmented rotation system for improving the efficiency of drive wheel and prime mover efficiency. The magnetically augmented rotation system includes includes a wheel assembly having a central portion, a first magnetic assembly with a first magnetic polarity, and a second magnetic assembly having a second magnetic polarity opposite the polarity of the first magnetic assembly; a bearing assembly for facilitation the rotation of the wheel assembly and comprised of non-magnetic material; a magnetic biasing assembly positioned such that a torquing force is applied to the wheel assembly by an interaction between the magnetic biasing assembly and the first and second magnetic assemblies; and an anti-reversing gear assembly coupled to the wheel assembly allowing the magnetically augmented rotation system to rotate in a first direction while preventing it from rotating in a second direction.

8 Claims, 2 Drawing Sheets

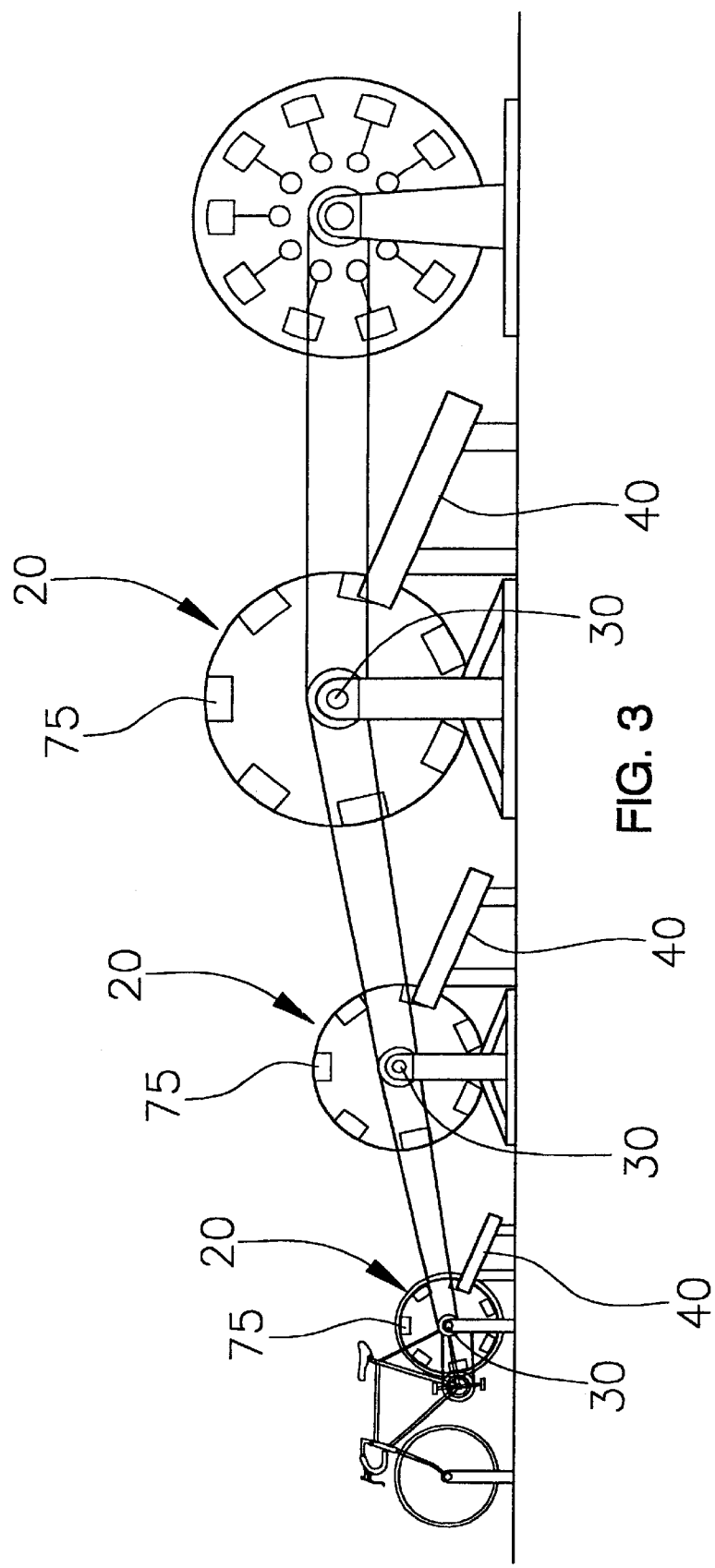

MAGNETICALLY AUGMENTED ROTATION SYSTEM

BACKGROUND OF THE INVENTION

1. Field of the Invention

The present invention relates to magnetic drive systems and more particularly pertains to a new magnetically augmented rotation system for improving the efficiency of drive wheel and prime mover efficiency.

2. Description of the Prior Art

The use of magnetic drive systems is known in the prior art. More specifically, magnetic drive systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,062,421; 3,768,532; 4,179,633; 3,734,565; 5,002,296; 2,351,424; and U.S. Pat. No. Des. 289,512.

While these devices fulfill their respective, particular objectives and requirements, the aforementioned patents do not disclose a new magnetically augmented rotation system. The inventive device includes a wheel assembly having a central portion, a first magnetic assembly with a first magnetic polarity, and a second magnetic assembly having a second magnetic polarity opposite the polarity of the first magnetic assembly; a bearing assembly for facilitation the rotation of the wheel assembly and comprised of non-magnetic material; a magnetic biasing assembly positioned such that a torquing force is applied to the wheel assembly by an interaction between the magnetic biasing assembly and the first and second magnetic assemblies; and an anti-reversing gear assembly coupled to the wheel assembly allowing the magnetically augmented rotation system to rotate in a first direction while preventing it from rotating in a second direction.

In these respects, the magnetically augmented rotation system according to the present invention substantially departs from the conventional concepts and designs of the prior art, and in so doing provides an apparatus primarily developed for the purpose of improving the efficiency of drive wheel and prime mover efficiency.

SUMMARY OF THE INVENTION

In view of the foregoing disadvantages inherent in the known types of magnetic drive systems now present in the prior art, the present invention provides a new magnetically augmented rotation system construction wherein the same can be utilized for improving the efficiency of drive wheel and prime mover efficiency.

The general purpose of the present invention, which will be described subsequently in greater detail, is to provide a new magnetically augmented rotation system apparatus and method which has many of the advantages of the magnetic drive systems mentioned heretofore and many novel features that result in a new magnetically augmented rotation system which is not anticipated, rendered obvious, suggested, or even implied by any of the prior art magnetic drive systems, either alone or in any combination thereof.

To attain this, the present invention generally comprises includes a wheel assembly having a central portion, a first magnetic assembly with a first magnetic polarity, and a second magnetic assembly having a second magnetic polarity opposite the polarity of the first magnetic assembly; a bearing assembly for facilitation the rotation of the wheel assembly and comprised of non-magnetic material; a magnetic biasing assembly positioned such that a torquing force is applied to the wheel assembly by an interaction between the magnetic biasing assembly and the first and second magnetic assemblies; and an anti-reversing gear assembly coupled to the wheel assembly allowing the magnetically augmented rotation system to rotate in a first direction while preventing it from rotating in a second direction.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new magnetically augmented rotation system apparatus and method which has many of the advantages of the magnetic drive systems mentioned heretofore and many novel features that result in a new magnetically augmented rotation system which is not anticipated, rendered obvious, suggested, or even implied by any of the prior art magnetic drive systems, either alone or in any combination thereof.

It is another object of the present invention to provide a new magnetically augmented rotation system which may be easily and efficiently manufactured and marketed.

It is a further object of the present invention to provide a new magnetically augmented rotation system which is of a durable and reliable construction.

An even further object of the present invention is to provide a new magnetically augmented rotation system which is susceptible of a low cost of manufacture with regard to both materials and labor, and which accordingly is then susceptible of low prices of sale to the consuming public, thereby making such magnetically augmented rotation system economically available to the buying public.

Still yet another object of the present invention is to provide a new magnetically augmented rotation system which provides in the apparatuses and methods of the prior art some of the advantages thereof, while simultaneously overcoming some of the disadvantages normally associated therewith.

Still another object of the present invention is to provide a new magnetically augmented rotation system for improving the efficiency of drive wheel and prime mover efficiency.

Yet another object of the present invention is to provide a new magnetically augmented rotation system which includes includes a wheel assembly having a central portion, a first magnetic assembly with a first magnetic polarity, and a second magnetic assembly having a second magnetic polarity opposite the polarity of the first magnetic assembly; a bearing assembly for facilitation the rotation of the wheel assembly and comprised of non-magnetic material; a magnetic biasing assembly positioned such that a torquing force is applied to the wheel assembly by an interaction between the magnetic biasing assembly and the first and second magnetic assemblies; and an anti-reversing gear assembly coupled to the wheel assembly allowing the magnetically augmented rotation system to rotate in a first direction while preventing it from rotating in a second direction.

Still yet another object of the present invention is to provide a new magnetically augmented rotation system that improves the rotational efficiency of bicycles.

Even still another object of the present invention is to provide a new magnetically augmented rotation system that improves the rotational efficiency of motor-generators.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic side view of multiple embodiments of the present invention in a cascade arrangement.

DESCRIPTION OF THE PREFERRED EMBODIMENT

Figures 1, 2:
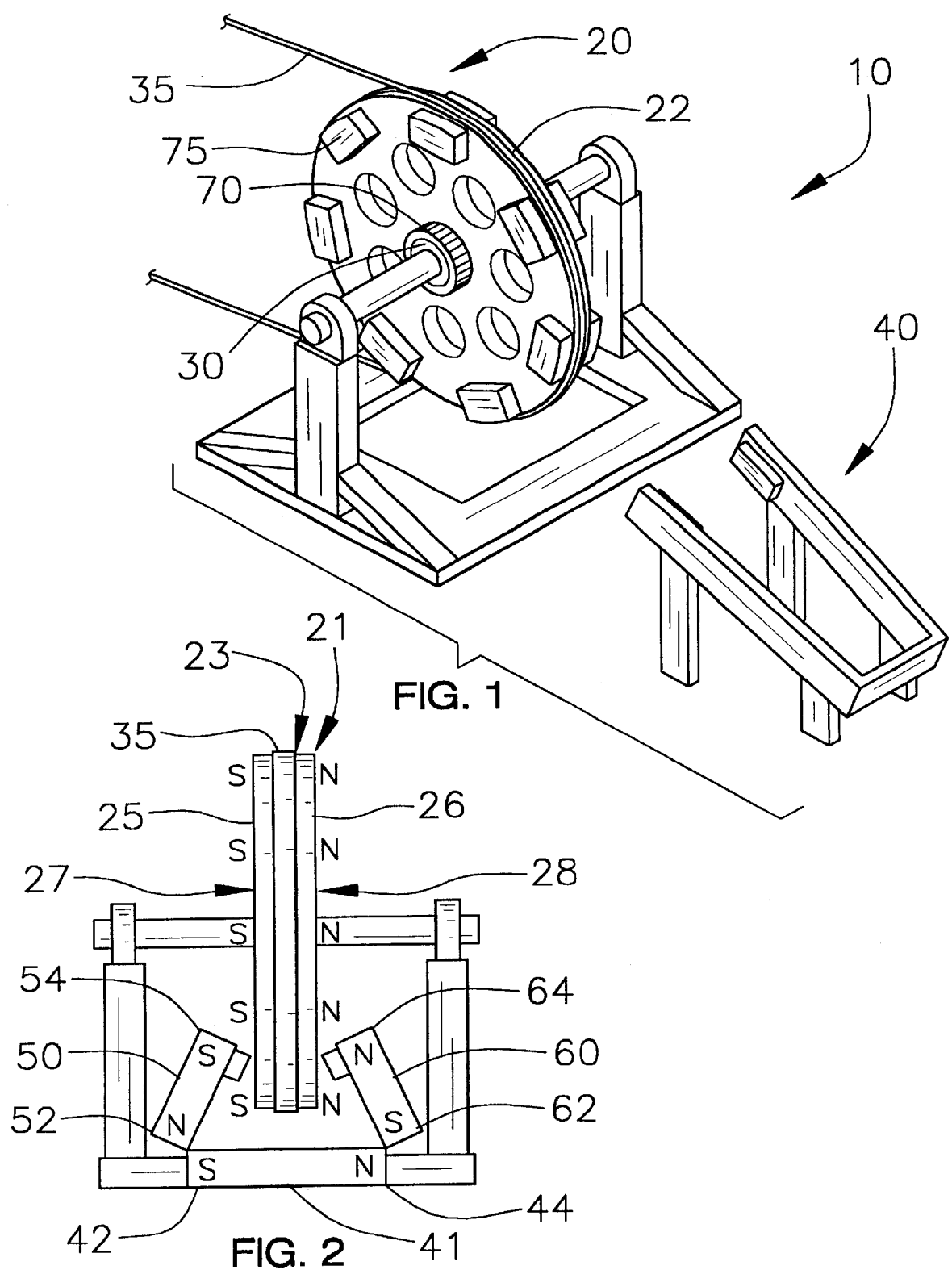
FIG. 1 is a schematic perspective view of a new magnetically augmented rotation system according to the present invention.
FIG. 2 is a schematic front view of an embodiment of the present invention.

With reference now to the drawings, and in particular to FIGS. 1 through 3 thereof, a new magnetically augmented rotation system embodying the principles and concepts of the present invention and generally designated by the reference numeral 10 will be described.

As best illustrated in FIGS. 1 through 3, the magnetically augmented rotation system 10 generally comprises a wheel assembly 20, a bearing assembly 30, a magnetic biasing assembly 40, and an anti-reversing gear assembly 70.

The wheel assembly 20 includes a central portion 22, a first magnetic assembly 25, and a second magnetic assembly 26. The first magnetic assembly 25 has a first magnetic polarity. The second magnetic assembly 26 has a magnetic polarity opposite the polarity of the first magnetic assembly 25.

The bearing assembly 30 is used to for facilitate the rotation of the wheel assembly 20. The bearing assembly 30 being comprised of non-magnetic material.

The magnetic biasing assembly 40 is positioned such that a torquing force is applied to the wheel assembly 20 by an interaction between the magnetic biasing assembly 40 and the first 25 and second magnetic assemblies 26.

The anti-reversing gear assembly 70 is coupled to the wheel assembly 20. The anti-reversing gear assembly 70 allows the magnetically augmented rotation system 10 to rotate in a first direction while preventing the magnetically augmented rotation system 10 from rotating in a second direction.

In an embodiment the first magnetic assembly 25 is a single magnetic disk coupled to the center portion 22 and is aligned such that a surface 27 of the first magnetic assembly 25 has a first magnetic polarity. The second magnetic assembly 26 is a single magnetic disk coupled to the center portion 22 and is aligned such that a surface 28 of the second magnetic assembly 26 has a second magnetic polarity.

In another embodiment the first magnetic assembly 25 is a plurality of magnets 75 positioned in a uniformly distributed relationship around a first side of the wheel assembly 20. Each one of the plurality of magnets 75 is positioned such that a magnetic polarity of each one of the plurality of magnets 75 is aligned. The second magnetic assembly 26 is also a plurality of magnets 75 positioned in a uniformly distributed relationship around a second side of the wheel assembly 20. Each one of the plurality of magnets 75 is positioned such that a magnetic polarity of each one of the plurality of magnets 75 is aligned and complimentary to the alignment of the first magnetic assembly 25.

An annular groove 23 is positioned around a circumference of the central portion 22 of the wheel assembly 20.

A drive belt 35 delivers a primary rotational force to the wheel assembly 20. The drive belt 35 is positioned in the annular groove 23. The drive belt 35 may be a belt or a chain.

The magnetic biasing assembly 40 further comprises a first linear magnet 41, a second linear magnet 50, and a third linear magnet 60.

The first linear magnet 41 is positioned such that a longitudinal axis of the first linear magnet 41 is substantially perpendicular with a plane which extends radially from a focus of the wheel assembly 20. The first linear magnet 41 preferably is positioned in a spaced perpendicular relationship with a circumferential edge 21 of the wheel assembly 20.

The second linear magnet 50 is positioned such that a first end 52 of the second linear magnet 50 abuts a first end 42 of the first linear magnet 41. The second linear magnet 50 preferably is positioned at an oblique angle such that the second linear magnet 50 rises upwardly towards the first magnetic assembly 25 of the wheel assembly 20 and a second end 54 of the second linear magnet 50 is adjacent to a surface 27 of the first magnetic assembly 25.

The third linear magnet 60 is positioned such that a first end 62 of the third linear magnet 60 abuts a second end 44 of the first linear magnet 41. The third linear magnet 60 preferably is positioned at an oblique angle such that the third linear magnet 60 rises upwardly towards the second magnetic assembly 26 of the wheel assembly 20 and a second end 64 of the third linear magnet 60 is adjacent to a surface 28 of the second magnetic assembly 26.

The first linear magnet 41 is magnetically polarized such that the first end 42 of the first linear magnet 41 has a first magnetic polarity and the second end 44 of the first linear magnet 41 has a second magnetic polarity. The second linear magnet 50 is magnetically polarized such that the first end 52 of the second linear magnet 50 includes a second magnetic polarity and the second end 54 of the second linear magnet 50 includes a first magnetic polarity. The third linear magnet 60 is magnetically polarized such that the first end 62 of the third linear magnet 60 includes a first magnetic polarity and the second end 64 of the third linear magnet 60 includes a second magnetic polarity.

The second ends 52,62 of the second 50 and third linear magnets 60 have magnetic polarities corresponding to the first 25 and second magnetic assemblies 26 respectively such that a repelling force occurs between the second linear magnet 50 and the first magnetic assembly 25 and between the third linear magnet 60 and the second magnetic assembly 26.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A magnetically augmented rotation system comprising:
   a wheel assembly having a central portion, a first magnetic assembly, and a second magnetic assembly, said first magnetic assembly having a first magnetic polarity, said second magnetic assembly having a magnetic polarity opposite the polarity of said first magnetic assembly;
   a bearing assembly for facilitation the rotation of said wheel assembly, said bearing assembly being comprised of non-magnetic material;
   a magnetic biasing assembly positioned such that a torquing force is applied to said wheel assembly by an interaction between said magnetic biasing assembly and said first and second magnetic assemblies;
   an anti-reversing gear assembly coupled to said wheel assembly, said anti-reversing gear assembly allowing said magnetically augmented rotation system to rotate in a first direction while preventing said magnetically augmented rotation system from rotating in a second direction; and
   wherein said magnetic biasing assembly further includes a first linear magnet positioned such that a longitudinal axis of said first linear magnet being substantially perpendicular with a plane extending radially from a focus of said wheel assembly, said linear magnet being positioned in a spaced perpendicular relationship with a circumferential edge of said wheel assembly;
   a second linear magnet positioned such that a first end of said second linear magnet abuts a first end of said first linear magnet, said second linear magnet being positioned at an oblique angle such that said second linear magnet rises upwardly and inwardly towards said first magnetic assembly of said wheel assembly and a second end of said second linear magnet is adjacent to a surface of said first magnetic assembly;
   a third linear magnet positioned such that a first end of said third linear magnet abuts a second end of said first linear magnet, said third linear magnet being positioned at an oblique angle such that said third linear magnet rises upwardly and inwardly towards said second magnetic assembly of said wheel assembly and a second end of said third linear magnet is adjacent to a surface of said second magnetic assembly.

2. The magnetically augmented rotation system of claim 1 wherein said wheel assembly further comprises:
   an annular groove positioned around a circumference of said central portion of said wheel assembly;
   a drive belt for delivering a primary rotational force to said wheel assembly, said drive belt being positioned in said annular groove.

3. The magnetically augmented rotation system of claim 1, wherein said magnetic biasing assembly further comprises:
   said first linear magnet being magnetically polarized such that said first end of said first linear magnet has a first magnetic polarity and said second end of said first linear, magnet has a second magnetic polarity;
   said second linear magnet being magnetically polarized such that said first end of said second linear magnet having a second magnetic polarity and said second end of said second linear magnet having a first magnetic polarity;
   said third linear magnet being magnetically polarized such that said first end of said third linear magnet having a first magnetic polarity and said second end of said third linear magnet having a second magnetic polarity;
   said second ends of said second and third linear magnets having magnetic polarities corresponding to said first and second magnetic assemblies respectively such that a repelling force occurs between said second linear magnet and said first magnetic assembly and between said third linear magnet and said second magnetic assembly.

4. The magnetically augmented rotation system of claim 1 wherein said wheel assembly further comprises:
   said first magnetic assembly being a plurality of magnets positioned in a uniformly distributed relationship around a first side of said wheel assembly, each one of said plurality of magnets being positioned such that a magnetic polarity of each one of said plurality of magnets is aligned;
   said second magnetic assembly being a plurality of magnets positioned in a uniformly distributed relationship around a second side of said wheel assembly, each one of said plurality of magnets being positioned such that a magnetic polarity of each one of said plurality of magnets is aligned and complimentary to the alignment of said first magnetic assembly.

5. The magnetically augmented rotation system of claim 4, further comprising:
an annular groove positioned around a circumference of said central portion of said wheel assembly;
a drive belt for delivering a primary rotational force to said wheel assembly, said drive belt being positioned in said annular groove;
wherein said magnetic biasing assembly further comprises:
said first linear magnet being magnetically polarized such that said first end of said first linear magnet has a first magnetic polarity and said second end of said first linear magnet has a second magnetic polarity;
said second linear magnet being magnetically polarized such that said first end of said second linear magnet having a second magnetic polarity and said second end of said second linear magnet having a first magnetic polarity;
said third linear magnet being magnetically polarized such that said first end of said third linear magnet having a first magnetic polarity and said second end of said third linear magnet having a second magnetic polarity;
said second ends of said second and third linear magnets having magnetic polarities corresponding to said first and second magnetic assemblies respectively such that a repelling force occurs between said second linear magnet and said first magnetic assembly and between said third linear magnet and said second magnetic assembly.

6. The magnetically augmented rotation system of claim 1, wherein said wheel assembly further comprises:
said first magnetic assembly being a single magnetic disk coupled to said center portion and being aligned such that a surface of said first magnetic assembly has a first magnetic polarity;
said second magnetic assembly being a single magnetic disk coupled to said center portion and being aligned such that a surface of said second magnetic assembly has a second magnetic polarity.

7. The magnetically augmented rotation system of claim 6, further comprising:
an annular groove positioned around a circumference of said central portion of said wheel assembly;
a drive belt for delivering a primary rotational force to said wheel assembly, said drive belt being positioned in said annular groove;
wherein said magnetic biasing assembly further comprises:
said first linear magnet being magnetically polarized such that said first end of said first linear magnet has a first magnetic polarity and said second end of said first linear magnet has a second magnetic polarity;
said second linear magnet being magnetically polarized such that said first end of said second linear magnet having a second magnetic polarity and said second end of said second linear magnet having a first magnetic polarity;
said third linear magnet being magnetically polarized such that said first end of said third linear magnet having a first magnetic polarity and said second end of said third linear magnet having a second magnetic polarity;
said second ends of said second and third linear magnets having magnetic polarities corresponding to said first and second magnetic assemblies respectively such that a repelling force occurs between said second linear magnet and said first magnetic assembly and between said third linear magnet and said second magnetic assembly.

8. A magnetically augmented rotation system comprising:
a wheel assembly having a central portion, a first magnetic assembly, and a second magnetic assembly, said first magnetic assembly having a first magnetic polarity, said second magnetic assembly having a magnetic polarity opposite the polarity of said first magnetic assembly;
a bearing assembly for facilitation the rotation of said wheel assembly, said bearing assembly being comprised of non-magnetic material;
a magnetic biasing assembly positioned such that a torquing force is applied to said wheel assembly by an interaction between said magnetic biasing assembly and said first and second magnetic assemblies;
an anti-reversing gear assembly coupled to said wheel assembly, said anti-reversing gear assembly allowing said magnetically augmented rotation system to rotate in a first direction while preventing said magnetically augmented rotation system from rotating in a second direction;
said first magnetic assembly being a single magnetic disk coupled to said center portion and being aligned such that a surface of said first magnetic assembly has a first magnetic polarity;
said second magnetic assembly being a single magnetic disk coupled to said center portion and being aligned such that a surface of said second magnetic assembly has a second magnetic polarity;
an annular groove positioned around a circumference of said central portion of said wheel assembly;
a drive belt for delivering a primary rotational force to said wheel assembly, said drive belt being positioned in said annular groove;
said magnetic biasing assembly further comprises:
a first linear magnet positioned such that a longitudinal axis of said first linear magnet being substantially perpendicular with a plane extending radially from a focus of said wheel assembly, said linear magnet being positioned in a spaced perpendicular relationship with a circumferential edge of said wheel assembly;
a second linear magnet positioned such that a first end of said second linear magnet abuts a first end of said first linear magnet, said second linear magnet being positioned at an oblique angle such that said second linear magnet rises upwardly and inwardly towards said first magnetic assembly of said wheel assembly and a second end of said second linear magnet is adjacent to a surface of said first magnetic assembly;
a third linear magnet positioned such that a first end of said third linear magnet abuts a second end of said first linear magnet, said third linear magnet being positioned at an oblique angle such that said third linear magnet rises upwardly and inwardly towards said second magnetic assembly of said wheel assembly and a second end of said third linear magnet is adjacent to a surface of said second magnetic assembly;
wherein said magnetic biasing assembly further comprises:
said first linear magnet being magnetically polarized such that said first end of said first linear magnet has a first magnetic polarity and said second end of said first linear magnet has a second magnetic polarity;

said second linear magnet being magnetically polarized such that said first end of said second linear magnet having a second magnetic polarity and said second end of said second linear magnet having a first magnetic polarity;

said third linear magnet being magnetically polarized such that said first end of said third linear magnet having a first magnetic polarity and said second end of said third linear magnet having a second magnetic polarity; and said second ends of said second and third linear magnets having magnetic polarities corresponding to said first and second magnetic assemblies respectively such that a repelling force occurs between said second linear magnet and said first magnetic assembly and between said third linear magnet and said second magnetic assembly.

* * * * *